INVENTOR.
Rudolph E. Herrstrum

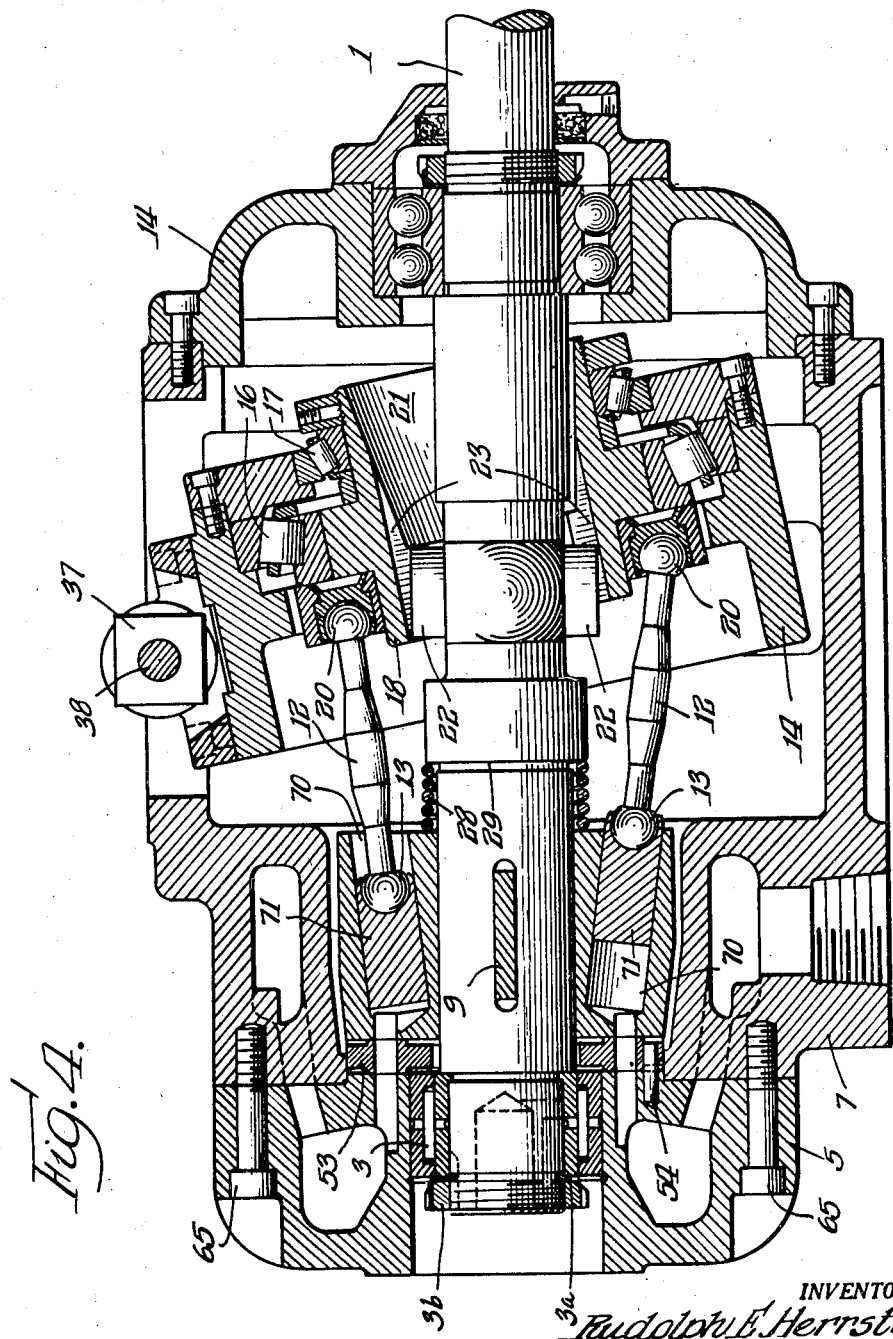

Patented Nov. 2, 1948

2,452,754

UNITED STATES PATENT OFFICE 2,452,754

VARIABLE POWER TRANSMISSION

Rudolph E. Herrstrum, Rockford, Ill., assignor to Rockford Machine Tool Company, Rockford, Ill., a corporation of Illinois Application February 21, 1944, Serial No. 523,188

11 Claims. (Cl. 74—60)

This invention relates to power transmission mechanism of the type which includes hydraulic cylinder and piston means of variable stroke and capacity whereby the pressure created in the fluid which is handled by said means or the velocity of such fluid may be varied to effect an alteration in the power or movement transmitted. The invention is particularly concerned with a mechanism of the swash plate type to which the pistons are connected and which may be adjusted to vary their stroke as desired.

One object of the invention is to provide a new and improved power transmitting mechanism of the type indicated.

Another object of the invention is to provide an operative connection between a rotary shaft and a swash plate or so-called "socket ring" disposed obliquely with respect to the shaft.

It is also an object of the invention to provide an improved "box" or bearing ring for the swash plate, together with hydraulically operable means for adjusting the angularity of said bearing ring and swash plate.

A further object of the invention is to provide an improved coupling between a shaft and a swash plate mechanism associated therewith, including means to reduce friction loss to a minimum in the transfer of power between the shaft and said mechanism.

More specifically, it is an object of the invention to provide a power transmission which includes a rotary shaft with a cylinder barrel fixed thereto and containing a plurality of cylinders with pistons therein, together with an obliquely adjustable swash plate connected to the pistons and a bearing ring in which it is rotatably mounted, said plate having a central opening encircling the shaft with longitudinal slots in said opening and with anti-friction rollers projecting radially from the shaft into said slots as the driving connection between the shaft and the swash plate.

Other objects and advantages of the invention will appear from the following description taken in connection with the accompanying drawings in which:

Fig. 4 is a sectional view similar to Fig. 1, but showing a modified arrangement of cylinders and pistons, omitting the stroke adjusting control device.

Figure 1:
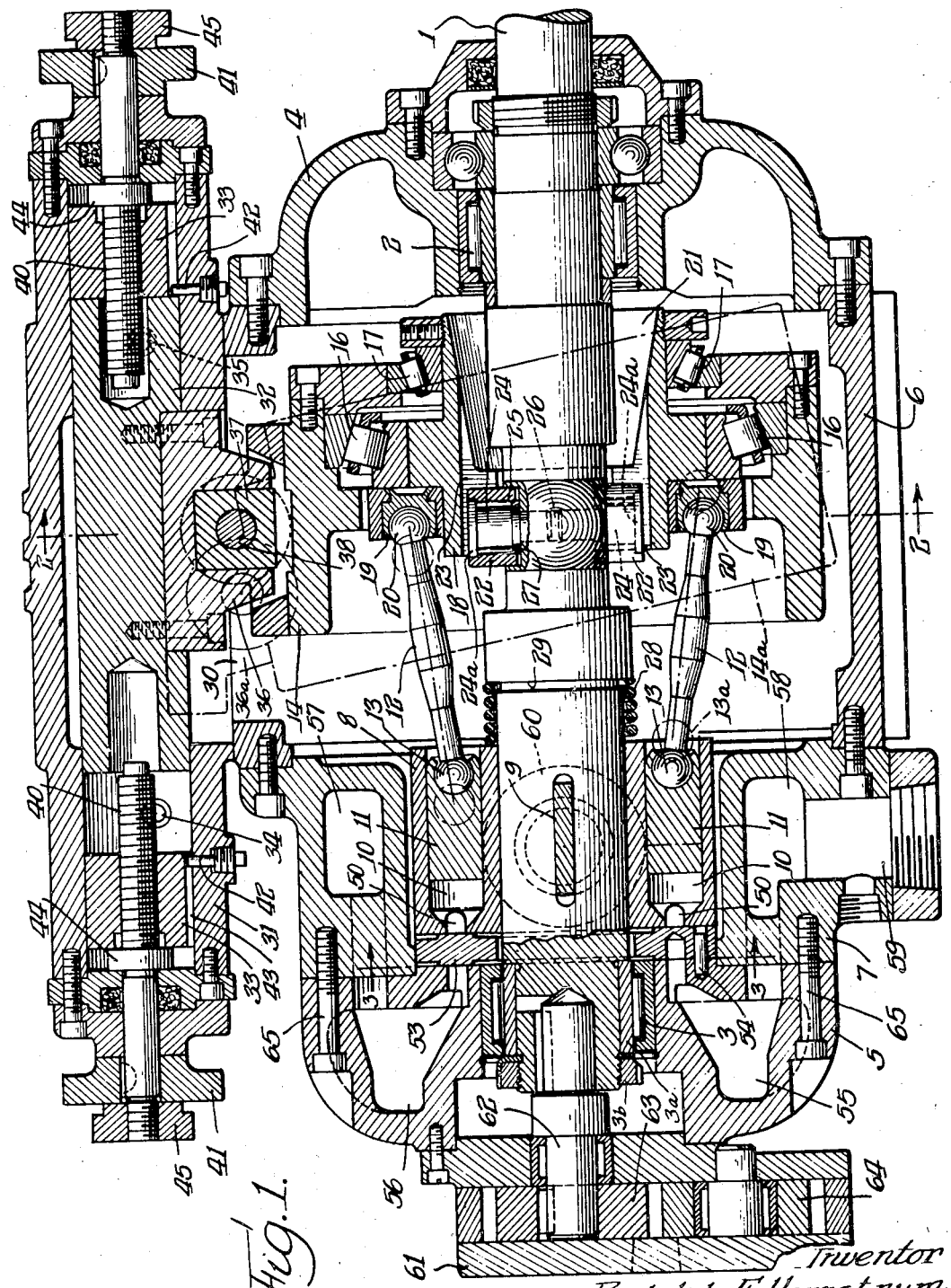
Fig. 1 is a vertical sectional view taken through the axis of the driving shaft of a mechanism embodying this invention, the section being not strictly diametral but being taken as indicated at line 1—1 on Fig. 2.

While there is illustrated in the drawings, and hereinafter described, a preferred form of the invention, it is contemplated that various modifications may be made by those skilled in the art without departing from the spirit and scope of the appended claims.

Figure 2:
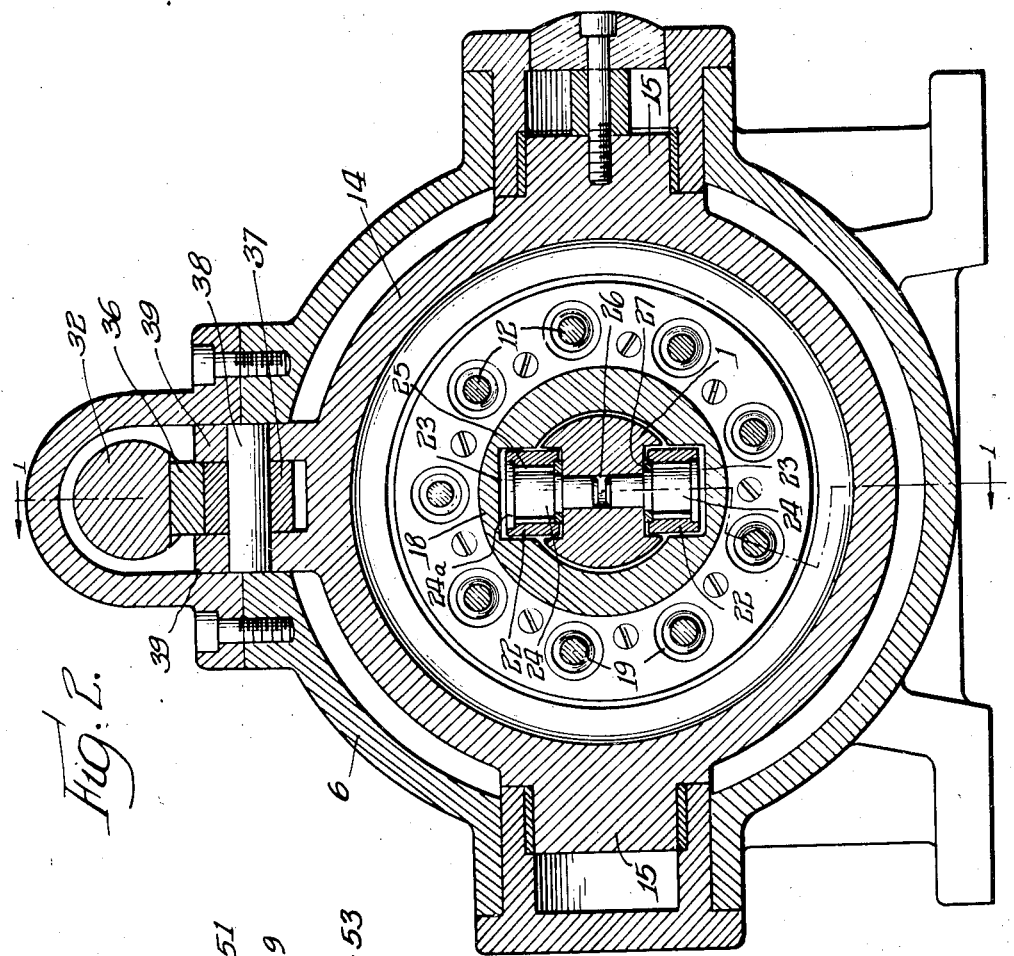
Fig. 2 is a transverse section taken substantially as indicated at line 2—2 on Fig. 1.
Figure 3:
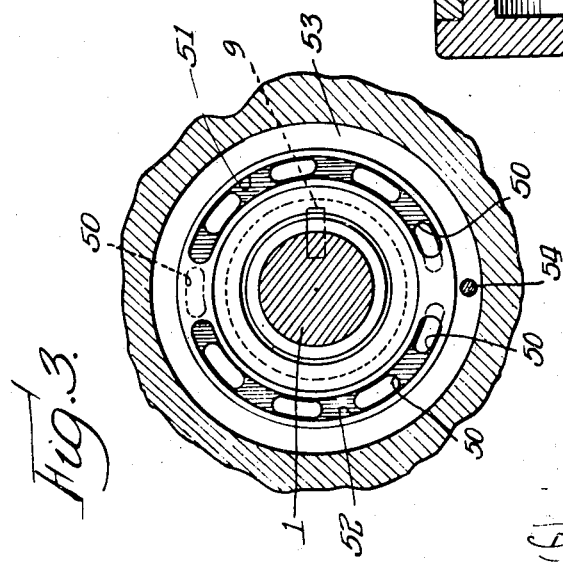
Fig. 3 is a detail transverse section taken as indicated at line 3—3 on Fig. 1 to show the valve ring and cylinder ports.

This invention is illustrated as a feature of a pumping mechanism which may be variously employed, either as a part of a power transmitting system or simply as a means for moving liquid from one place to another. For either purpose the pumping mechanism is designed to have a variable capacity, adjustable at will, such adjustability being a well understood feature involved in the swash plate type of drive as utilized for reciprocating a series of pump pistons. As shown in Fig. 1, the mechanism includes a drive shaft 1 which may be actuated from any suitable source of power, and which is journaled in roller bearings at 2 and 3, disposed respectively in end caps 4 and 5 of a housing or casing having a middle portion 6 of approximately cylindrical outline and an interposed section 7 which includes inlet and outlet manifolds for the pump. A cylinder barrel 8 is rotatably engaged with the shaft 1 by means of a key 9, but may be slidable along the shaft to a limited extent, and said barrel contains a plurality of pump cylinders 10 which are shown in Fig. 2 as distributed at equal intervals around the axis of the barrel 8. Each cylinder contains a piston 11 to which a piston rod or pitman 12 is connected by a universal ball joint at 13.

Within the middle portion 6 of the casing there is mounted a so-called "box" or bearing ring 14 which is supported on horizontal trunnions 15, 15, as seen in Fig. 2. Fig. 1 illustrates the bearing ring 14 in its upright or neutral position with its axis parallel to the longitudinal axis of the shaft 1, but it will be understood that it will be adjusted to an oblique position by rocking upon its trunnions 15, 15 to cause actuation of the pistons 11. The bearing ring 14 is provided with roller bearings 16 and roller bearings 17, by which it rotatably supports the swash plate proper, shown at 18, and sometimes referred to as the "socket ring" because it includes bearing sockets 19 for the spherical ends 20 of the piston rods 12. The swash plate 18 is formed with a central opening affording ample clearance around the shaft 1, a portion of said opening being of conical form, as seen at 21, to provide for the tilting adjustment of the bearing ring 14 on its trunnions 15, 15.

At all positions in the range of such adjustment the swash plate 18 is operatively coupled to the shaft 1 by means of rollers 22 projecting from opposite sides of the shaft 1 along the diameter thereof and engaging in slots 23, 23 which constitute portions of the central opening in the swash plate 18. These slots are just enough wider than the diameter of the rollers 22 to permit said rollers to turn freely as they traverse the slots. Each of the rollers 22 is supported by a headed stud 24 with needle rolls 25 forming an anti-friction bearing thereon; the reduced ends of the studs 24 are driven into a diametrically disposed hole 26 in the shaft 1, and portions of the rollers 22 are accommodated in recesses 27 formed in opposite sides of the shaft 1. The portion of the shaft at which the rollers 22 are located is of spherical contour, with the center of the sphere at the axis of the shaft and with its transverse diameter aligned substantially with the axes of the trunnions 15, 15. The spherical form provides some additional metal to compensate for the hole 26 drilled through the shaft at this point, as compared with a structure in which the shaft might be left strictly cylindrical.

The main portion 6 of the casing includes a slot or opening at 30, and surmounting the casing there is provided a cylinder 31 containing a piston 32 mounted to reciprocate between stop blocks 33, 33 in opposite ends of the cylinder. Fluid under pressure may be introduced through the port 34 or the port 35 for shifting the piston 32 through its entire range or any portion thereof, and such movement of the piston 32 is transmitted to the bearing ring 14 by means of a notched block 36 engaging a square block 37 which is carried on a pivot 38 supported in upstanding ears 39, 39 on the ring 14, as seen in Fig. 2. Each stop block 33 has a threaded bore by which it is engaged with the threaded stem 40 of a hand wheel 41 which is accessible outside the end of the cylinder 31, the block 33 being held against rotation by engagement of a pin or key 42 in a slot 43 in the block. The stem 40 includes a flange 44 and a lock nut 45 at its outer end so that when the block 33 has been adjusted at the desired position the stem may be locked by the clamping effect produced by tightening the lock nut 45.

Thus when the piston 32 is shifted to the left in Fig. 1, to the extent indicated by the broken outlines 13ª, 14ª and 36ª, it operates to tilt the bearing ring 14, so that when the shaft 1 is rotated the rollers 22, projecting from said shaft and engaging the slots 23 in the swash plate 18, cause the swash plate to revolve in an oblique plane corresponding to the inclination of the bearing ring 14. As the ends 20 of the pistons 12 traverse the resulting path in a plane oblique to the axis of the shaft 1, they are moved longitudinally and thus actuate the pistons 11 in their cylinders 10, the stroke of each piston depending upon the extent to which the bearing ring 14 has been tilted away from its original position perpendicular to the axis of the shaft 1. As the shaft 1 rotates, the lines of contact between the rollers 22 and the side walls of the slots 23 will shift longitudinally along the slots by reason of the oblique position of the swash plate 18, but the friction of this shifting movement will be reduced to a minimum by the presence of the roller 22 and needle rolls 25 on which they are journaled.

The pumping action of the pistons 11 is familiar and well understood by those skilled in the art, so that only brief reference need be made thereto. The head of each cylinder 10 is provided with a port 50, and these ports register with elongated arcuate ports 51 and 52 in a fixed annular valve plate or ring 53 as the cylinders 10 of the barrel 8 revolve against the face of this valve ring 53. The valve ring 53 is accurately fitted into a circular opening in the housing part 7, and may be held fixed by means of a dowel pin 54 extending from the valve ring into the adjacent face of the cap 5. A spring 28, coiled about the shaft 1, reacts between the shoulder 29 of said shaft and the barrel 8 to maintain contact between the valve ring 53 and the end of the barrel, and takes up wear of the ring. The cap 5 contains cored passages 55 and 56 which communicate respectively with the arcuate ports 51 and 52, and which are connected with cored passages 57 and 58 in the section 7 of the casing. The passage 58 has an inlet port 59, shown in Fig. 1 as leading in from the lower side of the casing, and the passage 57 has an outlet port 60, indicated in dotted outline in Fig. 1 as positioned at 90 degrees from the inlet port.

With the swash plate 18 tilted as indicated in dotted lines in Fig. 1, the piston rods 12 will be shifted toward the cylinder barrel 8 by the maximum amount as they pass over the highest point in their circuit directly above the axis of the shaft 1. As they approach this point they will be forcing the pistons 11 toward the heads of the cylinders 10, thus expelling the fluid therein through one of the elongated arcuate ports in the valve ring 53, and as they pass the top central position they will begin to withdraw the pistons 11 from the cylinder heads in their suction strokes, causing fluid to enter the cylinders and then to be expelled therefrom as the piston rods pass under the axis of the shaft and start to rise in their rotary travel. It will be evident that shifting the control piston 32 and its attached block 36 will alter the obliquity of the bearing ring 14 and swash plate 18, thus altering the stroke of each piston 11 and changing the quantity of liquid handled by the pumping mechanism in each revolution.

Preferably, and as shown in Fig. 1, the casing 61 of a small gear pump is detachably secured to the end cap 5 with the drive shaft 62 of the pump coupled to the shaft 1 by sliding engagement in a suitable recess in the end of the rotary shaft 1. The pump may comprise simply a pair of gears 63 and 64 operating in a well understood manner to supply hydraulic fluid under pressure for auxiliary purposes, as, for example, for use in the operation of the control piston 32, as already described. This pump is provided as an optional feature and may be omitted if desired, since its connection to the shaft 1 is made externally and the shaft bearing is adequately sealed independently of the presence of the gear pump.

In the main pump, as herein shown, the constant rotation of the cylinder barrel 8 in contact with one face of the valve ring 53 will eventually produce wear so as to require the replacement or reconditioning of the valve plate. This is rendered particularly convenient, however, by reason of the fact that the cap 5, which is secured to the section 7 of the casing by screws 65, may be readily removed without disturbing the piping connections to the ports 59 and 60 in the part 7, and when thus removed the cap 5 brings with it the entire bearing 3, including its inner raceway 3ª which is held on the shaft by a nut 3ᵇ. Removal of these parts fully exposes the valve ring 53, which may then be withdrawn from the circular opening in the part.

With the drive connection between the shaft 1 and the swash plate 18 consisting of rollers 22 which are themselves journaled on roller bearing 25, and with the swash plate itself carried on roller bearings 16 and 17, the friction incident to the operation of the swash plate is reduced to a minimum. The heads 24ª on the studs 24 overlap end surfaces of the rollers 22 so that these heads not only serve to retain the needle rolls 25 in position but also hold the rollers 22 in place so as to avoid contact of their end surfaces with the bottoms of the slots 23, said slots being made deep enough to provide clearance between their bottom walls and the ends of the rollers.

In the mechanism as herein shown the bearing ring 14 is adjustable from perpendicular position through a series of oblique positions in one direction therefrom, and the maximum obliquity may be predetermined by adjusting one of the stop blocks 33 which, at the same time, determines the maximum output of the pump cylinders 10. With the limiting positions thus adjusted the pumping action can be promptly controlled by introducing fluid through the port 34 or the port 35, thereby throwing the pump into neutral, inactive position or to wide open, full delivery position, as desired.

Fig. 4 presents a modified arrangement of the pumping cylinders and the pistons. In this design each of the pump cylinders 70 is arranged with its axis inclined slightly to the axis of the shaft 1 and all the cylinders are thus inclined at equal angles to the shaft axis. The inclination is such that the piston rods 12 may extend substantially in alignment with the pistons 71 so that the thrust is more efficiently transmitted by the piston rods to the pistons than when the piston rods are obliquely disposed with respect to their pistons, as in the structure of Fig. 1. Fig. 4 shows the parts with the bearing ring 14 tilted substantially at its position of maximum obliquity to the axis of the shaft 1. At intermediate position in its range of adjustment the alignment of the piston rods 12 with their pistons 71 will not be perfected, but it will be only slightly disturbed so that at practically all operating positions the piston rods are substantially in alignment with their pistons. It will be evident that this arrangement reduces to a minimum the relative motion and wear between the spherical ends 13 and 20 of the piston rods and their respective socket bearings, and also tends to eliminate side thrust and wear as between the pistons 71 and their cylinders 70.

I claim as my invention:

1. In a variable power transmission, the combination of a casing, a rotary shaft therein, a cylinder barrel fixed to said shaft and having cylinders disposed in a series around the shaft with their axes extending longitudinally with respect thereto, pistons in said cylinders, a bearing ring supported on said casing and encircling the shaft and disposed with its axis oblique to the shaft axis, a swash plate carried by said ring for rotation about the axis of the ring, piston rods connecting said swash plate with the several pistons, and a drive connection between said swash plate and the shaft comprising a pair of projections extending radially from opposite sides of the shaft, the swash plate having a central opening with inwardly facing longitudinal slots in which said projections are respectively engaged, and anti-friction means transmitting the driving torque from said projections to the swash plate.

2. In the combination defined in claim 1, said projections comprising studs secured in the shaft and said anti-friction means including a roller journaled on each of said studs for movable contact with a side wall of one of said slots.

3. In the combination defined in claim 1, said projections comprising studs secured in the shaft and said anti-friction means including rollers journaled on said studs with anti-friction roller bearings interposed between the studs and the rollers, said rollers being dimensioned to fit with clearance in said slots of the swash plate opening and having relative longitudinal movement therein.

4. In a pump mechanism, the combination of a casing, a rotary shaft journalled therein, a cylinder barrel fixed to said shaft and having cylinders disposed in a series around the shaft with their axes extending longitudinally with respect thereto, pistons in said cylinders, a bearing ring encircling the shaft and mounted on the casing for adjustment about a fixed axis perpendicular to the shaft axis and through a range of positions in which the axis of said ring is oblique to the axis of the shaft, a swash plate carried by said ring for rotation about the axis thereof, piston rods connecting the swash plate with the several pistons, and a drive connection between said swash plate and the shaft which includes a pair of cylindrical members projecting radially from opposite sides of the shaft, said members having a common axis which intersects the axis of the shaft and the axis of adjustment of the bearing ring in substantially a common point, and the swash plate having a central opening with inwardly facing longitudinal slots in which said cylindrical members are respectively engaged, said members being freely rotatable about their said common axis as they movably engage said slots during rotation of the shaft.

5. In a pump mechanism, the combination of a casing, a rotary shaft journaled therein, a cylinder barrel fixed to said shaft and having cylinders disposed in a series around the shaft with their axes extending longitudinally with respect thereto, pistons in said cylinders, a bearing ring encircling the shaft and supported by the casing for adjustment about an axis perpendicular to the shaft axis and through a range of positions in which the axis of said ring is oblique to the axis of the shaft, a swash plate journaled in said ring for rotation about the axis of the ring, piston rods connecting said swash plate with the several pistons, and a drive connection between said swash plate and the shaft comprising a pair of projections extending radially from opposite sides of the shaft, the swash plate having a central opening with inwardly facing longitudinal slots in which said projections are respectively engaged, the slots having longitudinal movement with relation to said projections as the swash plate rotates.

6. In the combination defined in claim 1, said projections comprising studs fixed in radial holes in the shaft and said anti-friction means including rollers journaled on said studs respectively and relatively movable with relation to said slots, the portion of the shaft in which said studs are secured being of spherical contour with a diameter greater than that of the adjacent cylindrical portions of the shaft and the holes for the studs being coaxial with a diameter of said spherical form.

7. In the combination defined in claim 1, said projections comprising studs secured in the shaft and said anti-friction means including a roller journaled on each of said studs and relatively movable with relation to its slot, each stud having a head at its outer end overlapping an end surface of the roller on the stud, and the slots being deep enough to provide clearance beyond the outer ends of the rollers to avoid contact between the end surface of each roller and the bottom of the slot which it traverses.

8. In a variable power transmission, the combination of a rotary shaft, a cylinder barrel fixed to said shaft and having cylinders disposed in a series around the shaft with their axes parallel thereto, pistons in said cylinders, a bearing ring encircling the shaft and disposed with its axis oblique to the shaft axis, a swash plate carried by said ring for rotation about the axis of the ring, piston rods connecting said swash plate with the several pistons, and a drive connection between said swash plate and the shaft comprising a pair of projections extending radially from opposite sides of the shaft, the swash plate having a central opening with inwardly facing longitudinal slots in which said projections are respectively engaged and relatively movable, and anti-friction means transmitting the driving torque from said projections to the swash plate.

9. In the combination defined in claim 8, said projections comprising studs secured in the shaft and said anti-friction means including rollers journaled on said studs with anti-friction roller bearings being dimensioned to fit with clearance in said slots of the swash plate opening, the walls of said slots being longitudinally movable with relation to said rollers as the swash plate rotates.

10. In a variable power transmission, the combination of a rotary shaft, a cylinder barrel fixed to said shaft and having cylinders disposed in a series around the shaft with their axes all equally inclined with respect to the axis of the shaft, a bearing ring encircling the shaft and disposed with its axis oblique to the shaft axis, a swash plate carried by said ring for rotation about the axis of the ring, piston rods connecting said swash plate with the several pistons, and a drive connection between said swash plate and the shaft comprising a pair of projections extending radially from opposite sides of the shaft, the swash plate having a central opening with inwardly facing longitudinal slots in which said projections are respectively engaged and relatively movable for transmitting the driving torque from said projections to the swash plate.

11. In the combination defined in claim 10, said bearing ring being supported by the casing for adjustment about an axis perpendicular to the shaft axis for varying the obliquity of the axis of the ring with respect to the axis of the shaft, said piston rods extending in substantial alignment with the axes of their respective pistons throughout the range of adjustment of said bearing ring.

RUDOLPH E. HERRSTRUM.

REFERENCES CITED

The following references are of record in the file of this patent:

UNITED STATES PATENTS

| Number | Name | Date |
|---|---|---|
| 511,044 | Cooper et al. | Dec. 19, 1893 |
| 951,278 | Janney | Mar. 8, 1910 |
| 1,263,180 | Williams | Apr. 16, 1918 |
| 1,362,040 | Pratt | Dec. 14, 1920 |
| 1,822,064 | Sorensen | Sept. 8, 1931 |
| 1,840,866 | Rayburn et al. | Jan. 12, 1932 |
| 2,146,117 | Gros | Feb. 7, 1939 |
| 2,272,771 | Hawley, Jr. | Feb. 10, 1942 |
| 2,292,125 | Ifield | Aug. 4, 1942 |
| 2,307,719 | Hawley, Jr. | Jan. 5, 1943 |

FOREIGN PATENTS

| Number | Country | Date |
|---|---|---|
| 419,135 | Great Britain | Oct. 29, 1934 |